United States Patent
Delaney et al.

(10) Patent No.: US 11,886,888 B2
(45) Date of Patent: Jan. 30, 2024

(54) REDUCED APPLICATION VIEW DURING LOADING

(71) Applicant: Lenovo (Singapore) Pte. Ltd., Singapore (SG)

(72) Inventors: Mark Patrick Delaney, Raleigh, NC (US); Nathan J. Peterson, Oxford, NC (US); Russell Speight VanBlon, Raleigh, NC (US); John Carl Mese, Cary, NC (US); Arnold S. Weksler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 12 days.

(21) Appl. No.: 16/368,454

(22) Filed: Mar. 28, 2019

(65) Prior Publication Data

US 2020/0310822 A1 Oct. 1, 2020

(51) Int. Cl.
G06F 3/048 (2013.01)
G06F 9/445 (2018.01)
G06F 3/0481 (2022.01)
G06F 3/04847 (2022.01)

(52) U.S. Cl.
CPC ............ *G06F 9/445* (2013.01); *G06F 3/0481* (2013.01); *G06F 3/04847* (2013.01); *G06F 2203/04803* (2013.01)

(58) Field of Classification Search
CPC ............................... G06F 3/0481; G06F 9/445
See application file for complete search history.

(56) References Cited

U.S. PATENT DOCUMENTS

| | | | | |
|---|---|---|---|---|
| 8,412,237 B1* | 4/2013 | Ohme | ............... | H04W 4/021 705/16 |
| 9,319,993 B1* | 4/2016 | Urbanus | ........... | H04W 52/0258 |
| 9,465,604 B1* | 10/2016 | Burgyan | ................ | H04L 67/61 |
| 2002/0103622 A1* | 8/2002 | Burge | ..................... | G16Z 99/00 702/183 |
| 2007/0255428 A1* | 11/2007 | Nagata | ............... | G03G 15/5075 700/8 |
| 2013/0235044 A1* | 9/2013 | Kaleta | ................... | G06F 3/0484 345/473 |
| 2014/0136942 A1* | 5/2014 | Kumar | ................... | G06F 40/106 715/229 |
| 2014/0156735 A1* | 6/2014 | Yamasaki | ............... | H04L 67/10 709/203 |
| 2014/0280472 A1* | 9/2014 | Riviello | ............... | H04L 67/535 709/203 |
| 2015/0066433 A1* | 3/2015 | Nagarajan | ............... | G06F 11/34 702/186 |
| 2015/0212655 A1* | 7/2015 | Koski | ................. | G06F 3/04817 715/730 |

(Continued)

*Primary Examiner* — Hua Lu
(74) *Attorney, Agent, or Firm* — Ference & Associates LLC (57) ABSTRACT

One embodiment provides a method, including: receiving, at an information handling device, a command from a user to load an application; determining, using a processor, whether a forecasted loading time for the application exceeds a loading tolerance threshold associated with the user; and providing, responsive to determining that the forecasted loading time exceeds the loading tolerance threshold, a reduced view of the application during a time period that the application is loading. Other aspects are described and claimed.

18 Claims, 5 Drawing Sheets

(56) References Cited

U.S. PATENT DOCUMENTS

| | | | |
|---|---|---|---|
| 2015/0370428 A1* | 12/2015 | Chan | H04L 67/1095 |
| | | | 715/739 |
| 2015/0373107 A1* | 12/2015 | Chan | H04L 67/1095 |
| | | | 709/205 |
| 2015/0378575 A1* | 12/2015 | Kaplinger | G06F 3/048 |
| | | | 715/760 |
| 2016/0092187 A1* | 3/2016 | Lerner | H04W 4/50 |
| | | | 717/178 |
| 2016/0309506 A1* | 10/2016 | Lim | H04W 74/006 |
| 2017/0070534 A1* | 3/2017 | Bailey | G06F 21/602 |
| 2017/0169336 A1* | 6/2017 | Singhal | G06F 16/9024 |
| 2017/0346909 A1* | 11/2017 | Hou | H04L 67/01 |
| 2017/0357465 A1* | 12/2017 | Dzeryn | G06F 3/0647 |
| 2018/0115463 A1* | 4/2018 | Sinha | H04L 41/5067 |
| 2018/0176311 A1* | 6/2018 | Sharma | H04L 67/535 |
| 2018/0260080 A1* | 9/2018 | Cho | G06F 3/0488 |
| 2020/0183470 A1* | 6/2020 | Lee | G06F 1/26 |
| 2020/0252281 A1* | 8/2020 | Abhyankar | H04L 41/083 |

* cited by examiner

REDUCED APPLICATION VIEW DURING LOADING

BACKGROUND

When activated, applications on information handling devices ("devices"), for example laptop and personal computers, tablets, smart phones, other electronic devices, and the like, generally have a loading time during which the contents associated with the application are prepared. The length of the loading time may be dependent on a variety of different factors such as the size of the application, the processing capabilities of the device, a network connection speed, a combination thereof, and the like. Once fully loaded, a user may interact with the application contents.

BRIEF SUMMARY

In summary, one aspect provides a method, comprising: receiving, at an information handling device, a command from a user to load an application; determining, using a processor, whether a forecasted loading time for the application exceeds a loading tolerance threshold associated with the user; and providing, responsive to determining that the forecasted loading time exceeds the loading tolerance threshold, a reduced view of the application during a time period that the application is loading.

Another aspect provides an information handling device, comprising: a processor; a memory device that stores instructions executable by the processor to: receive a command from a user to load an application; determine whether a forecasted loading time for the application exceeds a loading tolerance threshold associated with the user; and provide, responsive to determining that the forecasted loading time exceeds the loading tolerance threshold, a reduced view of the application during a time period that the application is loading.

A further aspect provides a product, comprising: a storage device that stores code, the code being executable by a processor and comprising: code that receives a command from a user to load an application; code that determines whether a forecasted loading time for the application exceeds a loading tolerance threshold associated with the user; and code that provides, responsive to determining that the forecasted loading time exceeds the loading tolerance threshold, a reduced view of the application during a time period that the application is loading.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4(A-B) illustrates an example of reduced view activation according to an embodiment.

FIG. 5(A-B) illustrates additional examples of a reduced view application window according to an embodiment.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etcetera. In other instances, well known structures, materials, or operations are not shown or described in detail to avoid obfuscation.

Generally, applications are displayed in a full-screen view on the user's device so that a user may easily visualize and/or interact with the application contents. Oftentimes, the full-screen view is immediately initiated upon application activation, even though the application has not fully loaded. During this full-screen loading period, many applications provide the user with some type of visual stimuli (e.g., a picture, an animation, a short video, a body of text, etc.) to keep them entertained and/or to hold their attention until the application is fully operable.

Conventionally, users cannot interact with other applications and/or perform other tasks on the device during the full-screen loading period. When the loading period for an application is relatively short (e.g., 10 seconds or less, etc.), then the immediate initiation of a full-screen loading period may not be much of an issue to a user. However, when the loading period is very long (e.g., close to 1 minute or more, etc.), then a user may become aggravated because they may be forced to wait for an extended period of time before they can interact with their device again. The latter of the two types of loading periods is a common occurrence when loading very large applications such as games (e.g., FORTNITE, CALL OF DUTY, etc.). FORTNITE is a registered trademark of Epic Games, Inc. in the United States and other countries. CALL OF DUTY is a registered trademark of Activision Publishing, Inc. in the United States and other countries.

Accordingly, an embodiment provides a method for forecasting loading times for different applications and allowing users to utilize other aspects of an operating system during long forecasted loading times. In an embodiment, a command from a user may be received to load an application. An embodiment may then determine whether a forecasted loading time for an application exceeds a loading tolerance threshold. Responsive to determining that it does, an embodiment may load the application in a reduced view. While in the reduced view, the loading application may only occupy a portion of the display screen, thereby allowing a user to perform other functions on the device until the application is fully loaded. Such a method may increase the user experience on devices by limiting user inactivity periods during loading processes.

The illustrated example embodiments will be best understood by reference to the figures. The following description is intended only by way of example, and simply illustrates certain example embodiments.

Figure 1:
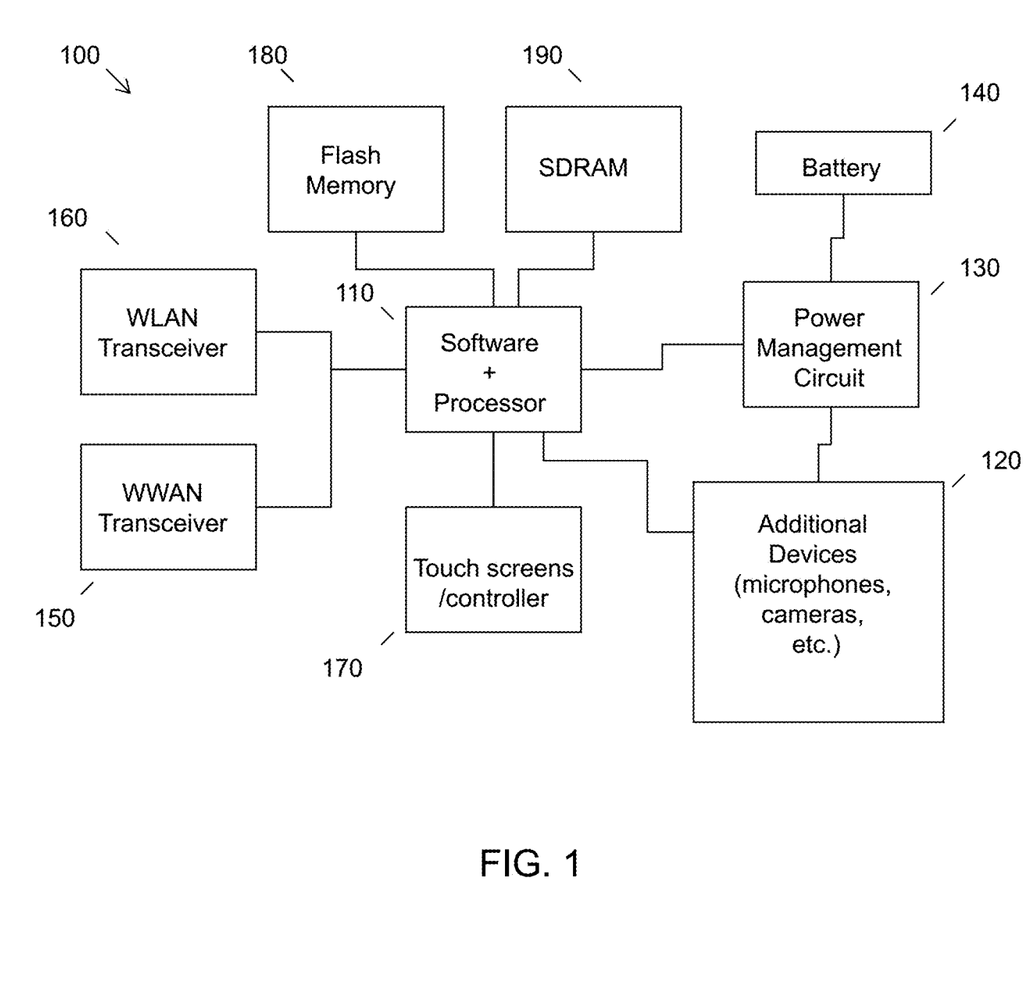
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
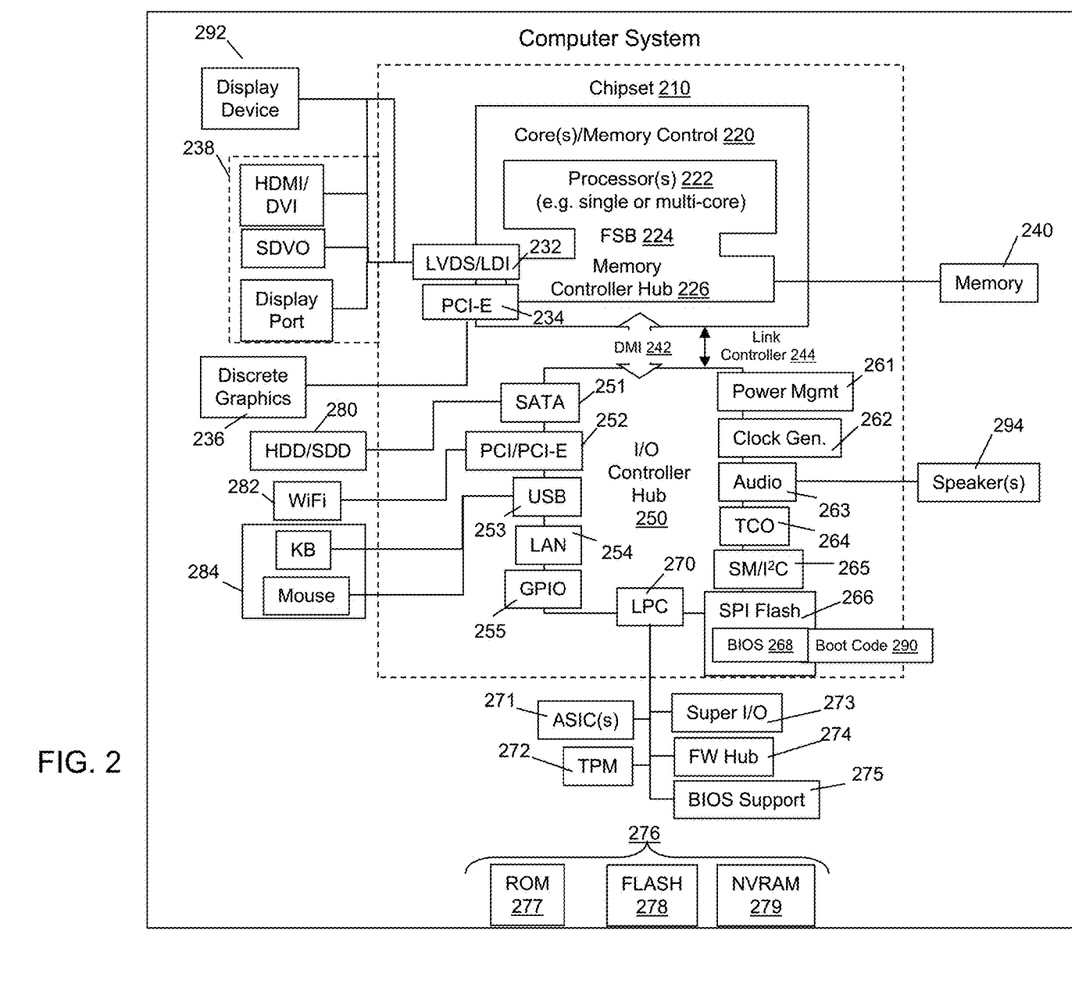
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as laptops, personal computers, smart phones, tablets, and/or other electronic devices that may comprise one or more display screens capable of displaying one or more applications. For example, the circuitry outlined in FIG. 1 may be implemented in a tablet or smart phone embodiment, whereas the circuitry outlined in FIG. 2 may be implemented in a laptop.

Figure 3:
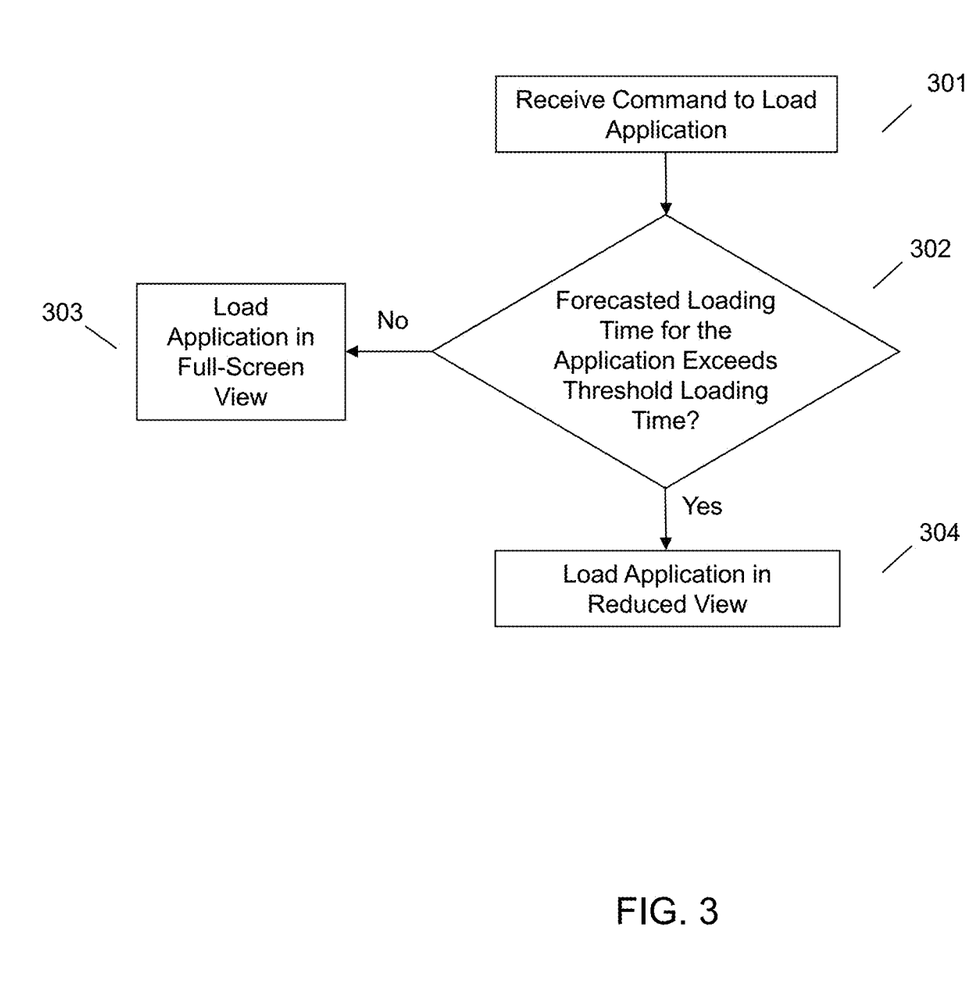
FIG. 3 illustrates an example method of reducing an application window while the application is loading.

Referring now to FIG. 3, an embodiment may provide a reduced view during a loading period for applications forecasted to have long loading times. At 301, an embodiment may receive a command from a user to load an application. In an embodiment, the command may be provided using virtually any command type (e.g., touch input, voice input, gesture input, etc.) and may be received by one or more relevant input devices (e.g., touch-sensitive display screen, audio capture device, image and/or video capture device, etc.).

At 302, an embodiment may determine whether a forecasted loading time for the application exceeds a loading tolerance threshold. In the context of this application, a forecasted loading time may refer to a projected time an application will take to fully, or substantially fully, load the application contents. In the context of this application, a loading tolerance threshold may refer to a projected application loading time limit in excess of which an application may be loaded in a reduced view. In an embodiment, the loading tolerance threshold may be originally set by a manufacturer and thereafter adjusted by a user. For example, a user may manually set (e.g., from a settings menu, etc.) an amount of time that they would be comfortable waiting for an application to load in a full-screen view (e.g., 7 seconds, 10 seconds, 30 seconds, etc.).

In an embodiment, the determination may be conducted by accessing a data store comprising a list of forecasted loading times for a plurality of applications. An embodiment may then identify, in the list, a forecasted loading time for a selected application and thereafter compare the identified forecasted loading time to a loading tolerance threshold to determine whether the forecasted loading time for the selected application exceeds the loading tolerance threshold. In an embodiment, the forecasted loading times stored in the list may be manually defined by a user. Alternatively, the forecasted loading times may be dynamically defined, without additional user input. For instance, an embodiment may define a forecasted loading time for an application by averaging all previous load times for that application on the user's device. As another example, an embodiment may define a forecasted loading time for an application by receiving crowdsourced data, from other devices, regarding the average loading times for an application across a predetermined number of users (e.g., the average time it took the application to load for 1000 users, etc.), across a particular device type (e.g., the average time it took the application to load on a particular smart phone, tablet, laptop, etc.).

Responsive to determining, at 302, that the forecasted loading time for the application does not exceed a threshold loading time, an embodiment may, at 303, load the application in a full-screen view. In this situation, a user may not mind waiting for an application to load in the traditional full-screen view because the forecasted loading time is projected to be small, or at least within a time period that a user is comfortable waiting. Applications that are likely to fall into this category are smaller applications such as a calendar application, calculator application, shopping application, banking application, etc. Conversely, responsive to determining, at 302, that the forecasted loading time for the application will exceed a threshold loading time, an embodiment may, at 304, load the application in a picture-in-picture ("reduced") view.

In an embodiment, the reduced view may correspond to a smaller, windowed view of the application. In such a view, a user may be able to interact with and provide inputs to other device contents (e.g., other applications, etc.) while the target application is loading. In an embodiment, the reduced view may provide the user with the same visuals as would appear during the loading period in a full-screen view. Alternatively, the reduced view may provide the user with a compressed amount of information than what would be available in the full-screen view (e.g., just the name of the application, a loading progress indicator, a combination thereof, etc.).

In an embodiment, the reduced view may automatically be provided at a predetermined portion of the device's display screen (e.g., as designated by a manufacturer or user, etc.). For example, the reduced view may always be provided at a predetermined spot on the display screen (e.g., the bottom right corner, etc.), regardless of whether or not content was being displayed at that predetermined spot. As another example, the reduced view may always be provided on a spot on a display screen that does not interfere with existing displayed content (e.g., other application icons, other images or text displayed in an application, etc.). In an embodiment, once the reduced view is displayed, a user may manually move the reduced view window to other portions of the display (e.g., by dragging the reduced view window with a user's finger or stylus, etc.). In an embodiment, other displayed articles may dynamically readjust their position to make way for the reduced view window.

In an embodiment, a user may manually exit the reduced view by providing an exit command (e.g., by tapping on an "X" arrow located somewhere in or proximate to the reduced view window, etc.). In an embodiment, a user may manually adjust the reduced view to a full-screen view by providing a selection command. For example, a user may tap or double-tap anywhere on the reduced view window to expand it to a full-screen view. The reduced view may be manually adjusted to the full-screen view via the selection command regardless of whether or not the application has finished loading. Alternatively, an embodiment may automatically, without additional user input, adjust the reduced view to a full-screen view at the moment the application has fully loaded.

Figure 4A:
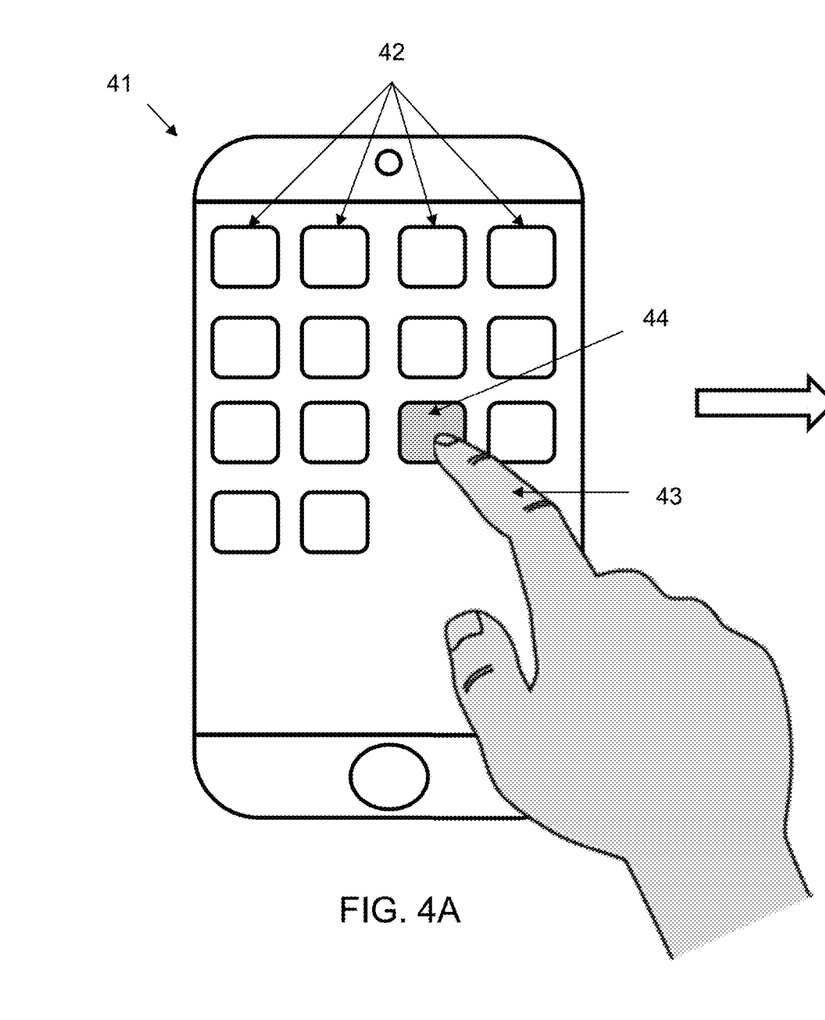
Figure 4B:
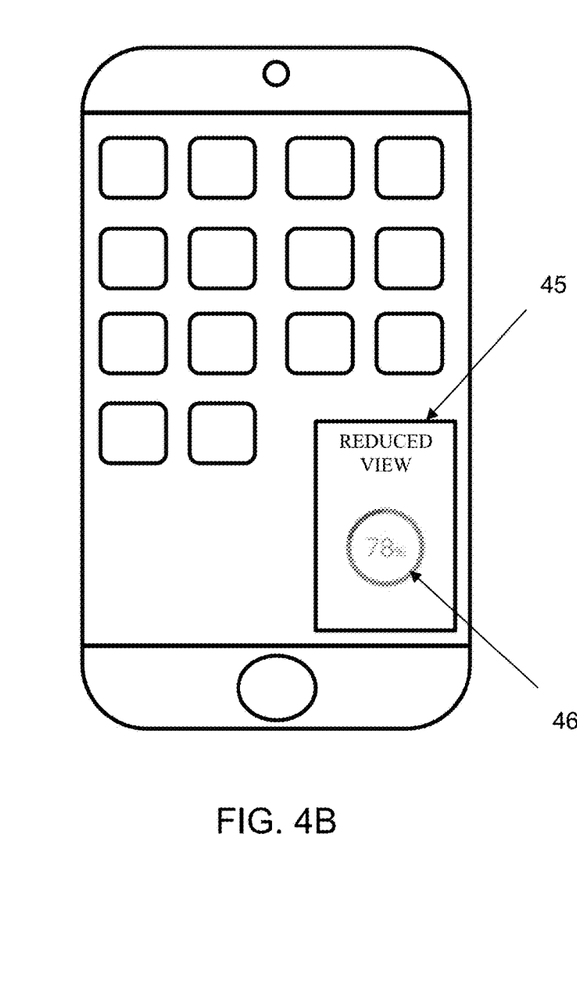

Referring now to FIGS. 4(A-B), an example illustration of reduced view activation is provided according to an embodiment. In FIG. 4A, a device 41 comprising a plurality of application icons 42 arranged on a home screen is provided. A user may select, e.g., with their finger 43, a target application 44 to activate. With reference to FIG. 4B, responsive to determining, at 302, that the forecasted loading time for the selected target application 44 will exceed a loading tolerance threshold, a reduced view window 45 may be provided of the target application 44. As illustrated in this embodiment, the reduced view window may comprise a loading progress indicator 46 that may provide an indication to the user how far along the application is to being fully loaded.

Figure 5A:
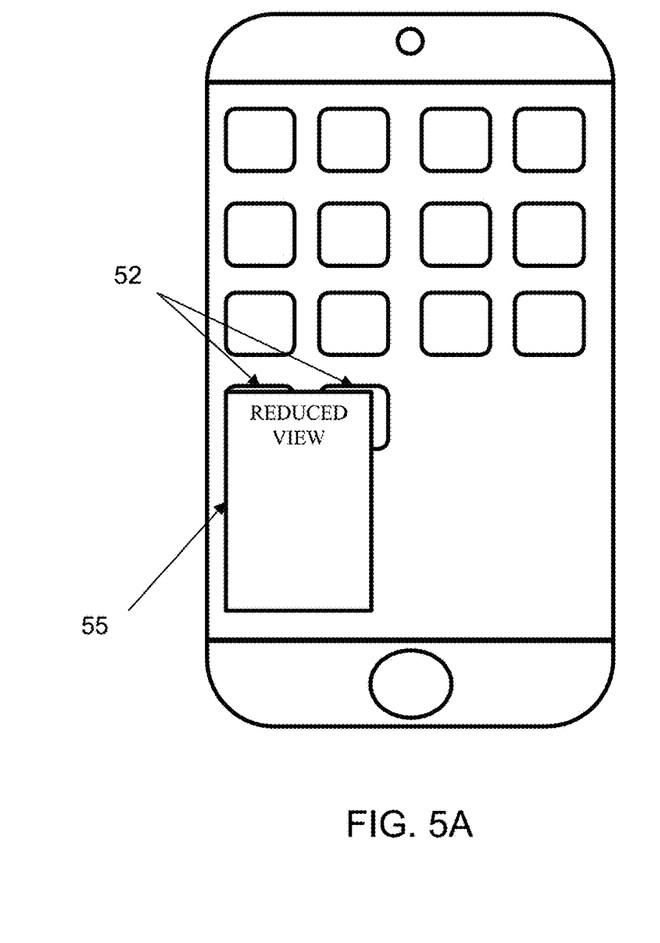
Figure 5B:
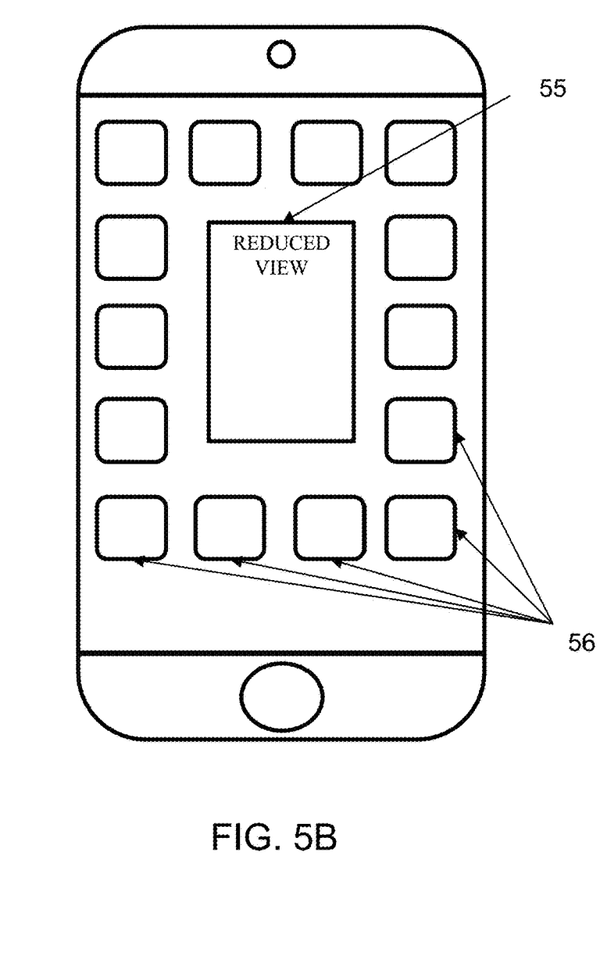

Referring now to FIGS. 5(A-B), additional example embodiments of reduced view windows are illustrated. At FIG. 5A, a reduced view window 55 is illustrated as being provided overtop existing application icons 52. In an embodiment, the reduced view window 55 may be automatically positioned at its current spot responsive to application activation or, alternatively, the reduced view window 55 may have been manually moved to its current spot from another location by a user. At FIG. 5B, an example illustration is shown of how surrounding content, in this case particular application icons 56, may dynamically readjust their position (from their original positions illustrated in FIG. 5A) to provide unobstructed space for the reduced view window 55.

The various embodiments described herein thus represent a technical improvement to conventional application loading techniques. Using the techniques described herein, an embodiment may receive a command from a user to load an application. An embodiment may then determine whether a forecasted loading time for the application exceeds a loading tolerance threshold. Responsive to determining that it does not, an embodiment may provide the application in a full-screen view while loading. However, responsive to determining that it does, an embodiment may provide the application in a reduced view while loading. Such a method may allow a user to interact with other aspects of the device during a long loading period.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, etcetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device having a particular device type, a command from a user to load an application;
   identifying a forecasted loading time for the application, wherein the identifying the forecasted loading time comprises:
      accessing a data store comprising a record of previous loading times for the application, wherein the record of previous loading times is based upon previous loading times across a predetermined number of users using the particular device type;
      determining an average of the previous loading times based upon the application and the particular device type; and
      identifying the forecasted loading time as the average;
   identifying, using a processor of the information handling device, a loading tolerance threshold associated with a user, wherein the loading tolerance threshold is designated by the user for the application;
   determining, using the processor, a forecasted loading time for the application exceeds the loading tolerance threshold; and
   providing, responsive to determining the forecasted loading time exceeds the loading tolerance threshold, a reduced view of the application on a portion of a display screen of the information handling device during a time period that the application is loading, wherein an application loading progress indicator is presented within the reduced view, wherein a remaining portion of the display screen other than the portion of a display screen is accessible by the user during the time period.

2. The method of claim 1, wherein the determining comprises accessing a data store comprising a list of forecasted loading times for a plurality of applications.

3. The method of claim 2, wherein the determining comprises identifying the forecasted loading time in the list corresponding to the application and identifying whether the identified forecasted loading time exceeds the loading tolerance threshold.

4. The method of claim 2, wherein the forecasted loading times in the list are dynamically updated each time a corresponding application is loaded.

5. The method of claim 1, wherein the loading tolerance threshold is designated by the user.

6. The method of claim 1, wherein the reduced view of the application is positioned at a predetermined portion of a display screen of the information handling device.

7. The method of claim 1, further comprising receiving user inputs to at least one other application and displaying contents associated with the at least one other application during the time period.

8. The method of claim 1, further comprising automatically adjusting the reduced view to a full-screen view responsive to identifying that the application is loaded.

9. The method of claim 1, further comprising providing, responsive to determining that the forecasted loading time does not exceed the loading tolerance threshold, the application in a full-screen view during the time period.

10. An information handling device, comprising:
a processor;
a memory device that stores instructions executable by the processor to:
receive a command from a user to load an application upon a particular device type;
identify a forecasted loading time for the application, wherein the instructions executable by the processor to identify the forecasted loading time comprise instructions executable by the processor to:
access a data store comprising a record of previous loading times for the application, wherein the record of previous loading times is based upon previous loading times across a predetermined number of users using the particular device type;
determine an average of the previous loading times based upon the application and the particular device type; and
identifying the forecasted loading time as the average;
identify a loading tolerance threshold associated with a user, wherein the loading tolerance threshold is designated by the user for the application;
determine a forecasted loading time for the application exceeds the loading tolerance threshold; and
provide, responsive to determining the forecasted loading time exceeds the loading tolerance threshold, a reduced view of the application on the information handling device during a time period that the application is loading, wherein an application loading progress indicator is presented within the reduced view, wherein a remaining portion of the display screen other than the portion of a display screen is accessible by the user during the time period.

11. The information handling device of claim 10, wherein the instructions executable by the processor to determine comprise instructions executable by the processor to access a data store comprising a list of forecasted loading times for a plurality of applications.

12. The information handling device of claim 11, wherein the forecasted loading times in the list are dynamically updated each time a corresponding application is loaded.

13. The information handling device of claim 10, wherein the loading tolerance threshold is designated by the user.

14. The information handling device of claim 10, wherein the reduced view of the application is positioned at a predetermined portion of a display screen of the information handling device.

15. The information handling device of claim 10, wherein the instructions are further executable by the processor to receive user inputs to at least one other application and display contents associated with the at least one other application during the time period.

16. The information handling device of claim 10, wherein the instructions are further executable by the processor to automatically adjust the reduced view to a full-screen view responsive to identifying that the application is loaded.

17. The information handling device of claim 10, wherein the instructions are further executable by the processor to provide, responsive to determining that the forecasted loading time does not exceed the loading tolerance threshold, the application in a full-screen view during the time period.

18. A product, comprising:
a storage device that stores code, the code being executable by a processor and comprising:
code that receives a command from a user to load an application upon a particular device type;
code that identifies a forecasted loading time for the application, wherein the code that identifies the forecasted loading time comprises code that:
accesses a data store comprising a record of previous loading times for the application, wherein the record of previous loading times is based upon previous loading times of each across a predetermined number of users using the particular device type;
determine an average of the previous loading times based upon the application and the particular device type; and
identifying the forecasted loading time as with the average;
code that identifies a loading tolerance threshold associated with a user, wherein the loading tolerance threshold is designated by the user for the application;
code that determines a forecasted loading time for the application exceeds the loading tolerance threshold; and
code that provides, responsive to determining the forecasted loading time exceeds the loading tolerance threshold, a reduced view of the application during a time period that the application is loading, wherein an application loading progress indicator is presented within the reduced view, wherein a remaining portion of the display screen other than the portion of a display screen is accessible by the user during the time period.

* * * * *